(12) United States Patent
Chauvel et al.

(10) Patent No.: US 7,757,067 B2
(45) Date of Patent: Jul. 13, 2010

(54) PRE-DECODING BYTECODE PREFIXES SELECTIVELY INCREMENTING STACK MACHINE PROGRAM COUNTER

(75) Inventors: Gerard Chauvel, Antibes (FR); Serge Lasserre, Frejus (FR); Maija Kuusela, Mouans Sartoux (FR)

(73) Assignee: Texas Instruments Incorporated, Dallas, TX (US)

( * ) Notice: Subject to any disclaimer, the term of this patent is extended or adjusted under 35 U.S.C. 154(b) by 695 days.

(21) Appl. No.: 10/632,222

(22) Filed: Jul. 31, 2003

(65) Prior Publication Data

US 2004/0078552 A1    Apr. 22, 2004

Related U.S. Application Data

(60) Provisional application No. 60/400,391, filed on Jul. 31, 2002.

(30) Foreign Application Priority Data

Jul. 30, 2003   (EP)   ................. 03291920

(51) Int. Cl.
*G06F 9/30* (2006.01)
*G06F 9/40* (2006.01)
(52) U.S. Cl. .................. 712/209; 712/227; 712/241
(58) Field of Classification Search .................. 712/209
See application file for complete search history.

(56) References Cited

U.S. PATENT DOCUMENTS

| | | | | |
|---|---|---|---|---|
| 6,014,735 A | * | 1/2000 | Chennupaty et al. ........ | 712/210 |
| 6,098,089 A | | 8/2000 | O'Connor et al. ........... | 709/104 |
| 6,161,172 A | * | 12/2000 | Narayan et al. ............. | 712/204 |
| 6,263,423 B1 | | 7/2001 | Coon et al. | |
| 6,567,905 B2 | | 5/2003 | Otis ........................... | 711/170 |
| 6,571,260 B1 | | 5/2003 | Morris ....................... | 707/206 |
| 6,775,763 B2 | * | 8/2004 | Sexton et al. ............... | 712/227 |
| 2002/0065990 A1 | | 5/2002 | Chauvel et al. ............. | 711/137 |

(Continued)

FOREIGN PATENT DOCUMENTS

WO      96/24895 A     8/1996

(Continued)

OTHER PUBLICATIONS

"Nazomi Introduces First Universal Java Accelerator Chip for Mobile Wireless Applications", Jan. 28, 2002.*

(Continued)

*Primary Examiner*—Niketa I Patel
*Assistant Examiner*—Jesse R Moll
(74) *Attorney, Agent, or Firm*—Lawrence J. Bassuk; W. James Brady; Frederick J. Telecky, Jr.

(57) ABSTRACT

A processor (e.g., a co-processor) comprising a decoder coupled to a pre-decoder, in which the decoder decodes a current instruction in parallel with the pre-decoder pre-decoding a subsequent instruction. In particular, the pre-decoder examines at least five Bytecodes in parallel with the decoder decoding a current instruction. The pre-decoder determines if a subsequent instruction contains a prefix. If a prefix is detected in at least one of the five Bytecodes, a program counter skips the prefix and changes the behavior of the decoder during the decoding of the subsequent instruction.

6 Claims, 3 Drawing Sheets

140 →

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE/ADDRESS INDEX 0 (AI0) |
| R9 | GENERAL PURPOSE/ADDRESS INDEX 1 (AI1) |
| R10 | GENERAL PURPOSE (GP) |
| R11 | GENERAL PURPOSE (GP) |
| R12 | MICRO-PROGRAM COUNTER (micro-PC) |
| R13 | GENERAL PURPOSE (GP) |
| R14 | GENERAL PURPOSE/INDIRECT REGISTER INDEX (IRI) |
| R15 | STATUS AND CONTROL (ST) |

160 → (R4)

U.S. PATENT DOCUMENTS

2002/0069332 A1 6/2002 Chauvel et al. ............. 711/144
2002/0116598 A1* 8/2002 Leijten ...................... 712/207
2003/0101320 A1 5/2003 Chauvel et al. ............. 711/154

FOREIGN PATENT DOCUMENTS

WO 01/44929 A 6/2001

OTHER PUBLICATIONS

"The Java Virtual Machine Specification" Sun Microsystems, Inc. 1999.*

Google Groups, "New bytecodes for 'real' Java?" forum, Nov. 1998.*

*Embedded JAVA*, Vincent Perrier, Aug. 15, 2001, (3 p.); Online http://www.onjava.com/pub/a/onjava/synd/2001/08/15/embedded.html.

"Java Processors, Coprocessor Perform Direct Bytecode Execution", Wong, W., Electronic Design, Penton Media, Cleveland, OH, vol. 48, No. 15, Jul. 24, 2000, p. 25/26, XP001104342, ISSN: 0013-4872.

* cited by examiner

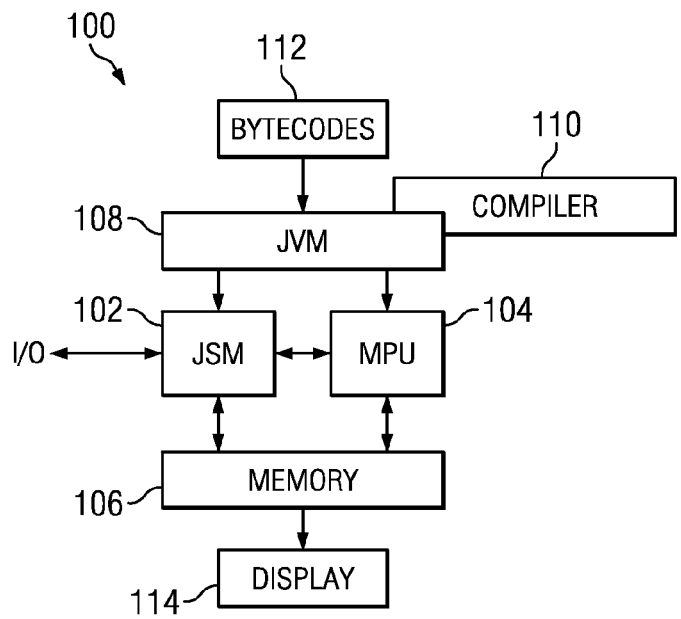

FIG. 1

| R0 | GENERAL PURPOSE (GP) |
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE/ADDRESS INDEX 0 (AI0) |
| R9 | GENERAL PURPOSE/ADDRESS INDEX 1 (AI1) |
| R10 | GENERAL PURPOSE (GP) |
| R11 | GENERAL PURPOSE (GP) |
| R12 | MICRO-PROGRAM COUNTER (micro-PC) |
| R13 | GENERAL PURPOSE (GP) |
| R14 | GENERAL PURPOSE/INDIRECT REGISTER INDEX (IRI) |
| R15 | STATUS AND CONTROL (ST) |

FIG. 3

PRE-DECODING BYTECODE PREFIXES SELECTIVELY INCREMENTING STACK MACHINE PROGRAM COUNTER

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291920.1, filed Jul. 30, 2003 and entitled "Program Counter Adjustment Based On The Detection Of An Instruction Prefix," incorporated herein by reference. This application also may contain subject matter that may relate to the following commonly assigned co-pending applications incorporated herein by reference: "System And Method To Automatically Stack And Unstack Java Local Variables," Ser. No. 10/632,228, filed Jul. 31, 2003, now U.S. Pat. No. 7,069,415, granted Jun. 27, 2006; "Memory Management Of Local Variables," Ser. No. 10/632,067, filed Jul. 31, 2003, now U.S. Pat. No. 7,023,797, granted Apr. 10, 2007; "Memory Management Of Local Variables Upon A Change Of Context," Ser. No. 10/632,076, filed Jul. 31, 2003, Pub. No. 2004/0,078,522, published Apr. 22, 2004; "A Processor With A Split Stack," Ser. No. 10/632,079, filed Jul. 31, 2003, now U.S. Pat. No. 7,058,765, granted Jun. 6, 2006; "Using IMPDEP2 For System Commands Related To Java Accelerator Hardware," Ser. No. 10/632,069, filed Jul. 31, 2003, now U.S. Pat. No. 7,360,060, granted Apr. 15, 2008; "Test With Immediate And Skip Processor Instruction," Ser. No. 10/632,214, filed Jul. 31, 2003, Pub. No. 2004/0,024,997, published Feb. 5, 2004; "Test And Skip Processor Instruction Having At Least One Register Operand," Ser. No. 10/632,084, filed Jul. 31, 2003, Pub. No. 2004/0,153,885, published Aug. 5, 2004; "Synchronizing Stack Storage," Ser. No. 10/632,422, filed Jul. 31, 2003, now U.S. Pat. No. 7,162,586, granted Jan. 9, 2007; "Methods And Apparatuses For Managing Memory," Ser. No. 10/631,252, filed Jul. 31, 2003, Pub. No. 2004/0,024,969, published Feb. 5, 2004; "Write Back Policy For Memory," Ser. No. 10/631,185, filed Jul. 31, 2003, Pub. No. 2004/0,024,792, published Feb. 5, 2004; "Methods And Apparatuses For Managing Memory," Ser. No. 10/631,205, filed Jul. 31, 2003, Pub. No. 2004/0,024,970, published Feb. 5, 2004; "Mixed Stack-Based RISC Processor," Ser. No. 10/631,308, filed Jul. 31, 2003, Pub. No. 2004/0,024,989, published Feb. 5, 2004; "Processor That Accommodates Multiple Instruction Sets And Multiple Decode Modes," Ser. No. 10/631,246, filed Jul. 31, 2003, Pub. No. 2004/0,024,990, published Feb. 5, 2004; "System To Dispatch Several Instructions On Available Hardware Resources," Ser. No. 10/631,585, filed Jul. 31, 2003, now U.S. Pat. No. 7,395,413, granted Jul. 1, 2008; "Micro-Sequence Execution In A Processor," Ser. No. 10/632,216, filed Jul. 31, 2003, Pub. No. 2004/0,024,999, published Feb. 5, 2004; "Reformat Logic To Translate Between A Virtual Address And A Compressed Physical Address," Ser. No. 10/632,215 filed Jul. 31, 2003, now U.S. Pat. No. 7,506,131, granted Mar. 7, 2009; "Synchronization Of Processor States," Ser. No. 10/632,024, filed Jul. 31, 2003, Pub. No. 2004/0,024,988, published Feb. 5, 2004; "Conditional Garbage Based On Monitoring To Improve Real Time Performance," Ser. No. 10/631,195, filed Jul. 31, 2003, now U.S. Pat. No. 7,392,269, granted Jun. 24, 2008; "Inter-Processor Control," Ser. No. 10/631,120, filed Jul. 31, 2003, now U.S. Pat. No. 7,434,029, granted Oct. 7, 2008; "Cache Coherency In A Multi-Processor System," Ser. No. 10/632,229, filed Jul. 31, 2003, now U.S. Pat. No. 6,996,683, granted Feb. 7, 2006; "Concurrent Task Execution In A Multi-Processor Single Operating System Environment," Ser. No. 10/632,077, filed Jul. 31, 2003, Pub. No. 2004/0,025,11, published Feb. 5, 2004; and "A Multi-Processor Computing System Having A Java Stack Machine And A RISC-Based Processor," Ser. No. 10/631,939, filed Jul. 31, 2003, Pub. No. 2004/0,078,550, published Apr. 22, 2004.

BACKGROUND OF THE INVENTION

1. Technical Field of the Invention

The present invention relates generally to processors and more particularly to a processor capable of changing a decoder behavior based on the detection of a prefix during a pre-decode step.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY OF THE PREFERRED EMBODIMENTS

As disclosed herein, a processor (e.g., a co-processor) includes a decode logic decoding a current instruction in parallel with a pre-decode logic pre-decoding the next instruction to determine if the next instruction includes a predetermined prefix. The prefix may indicate an instruction set to which the next instruction belongs. The prefix also may indicate the format of the next instruction. In accordance with at least some embodiments of the invention, the decode logic may change the decoding behavior of the decode logic based on the type of prefix determined by the pre-decode logic. In addition, the pre-decode logic also may further determine the identity of subsequent bytes in parallel with the decoding of the current instruction by the decode logic. In some embodiments, the pre-decode logic may pre-decode at least subsequent five bytes in parallel with the decoding of the current instruction.

Other embodiments may include a system (e.g., a cellular telephone) that includes a main processor unit coupled to a co-processor. The co-processor may include a decode logic. The decode logic may be able to decode instructions from different instruction set and may also decode different instruction formats (e.g., variable instruction lengths or variable opcode lengths). In addition, the co-processor may also include a pre-decode logic coupled to the decode logic. The pre-decode logic operates in parallel with the decode logic, in which the pre-decode logic pre-decodes a next instruction while the decode logic decodes a current instruction. The pre-decode logic determines what instruction set the next instruction belongs to and/or the format of the next instruction. In particular, the pre-decode logic determines if the next instruction consists of a prefix. If a prefix is determined, the decode logic may temporarily change the behavior of the decoding operation for the next instruction.

In some embodiments, a register (e.g., a program counter) may be used to indicate a current instruction the decode logic may be decoding. However, in cases where a prefix of a next instruction is determined by the pre-decode logic, the program counter may skip the prefix, such that the decode logic does not decode the prefix. As such, the prefix does not enter the normal execution pipeline flow and therefore, no time penalty is incurred for executing two instruction sets or multiple instruction formats.

Notation and Nomenclature

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 1 shows a diagram of a system in accordance with preferred embodiments of the invention and including a Java Stack Machine ("JSM") and a Main Processor Unit ("MPU");

FIG. 3 shows various registers used in the JSM of FIGS. 1 and 2;

DETAILED DESCRIPTION OF THE PREFERRED EMBODIMENTS

Figure 2:
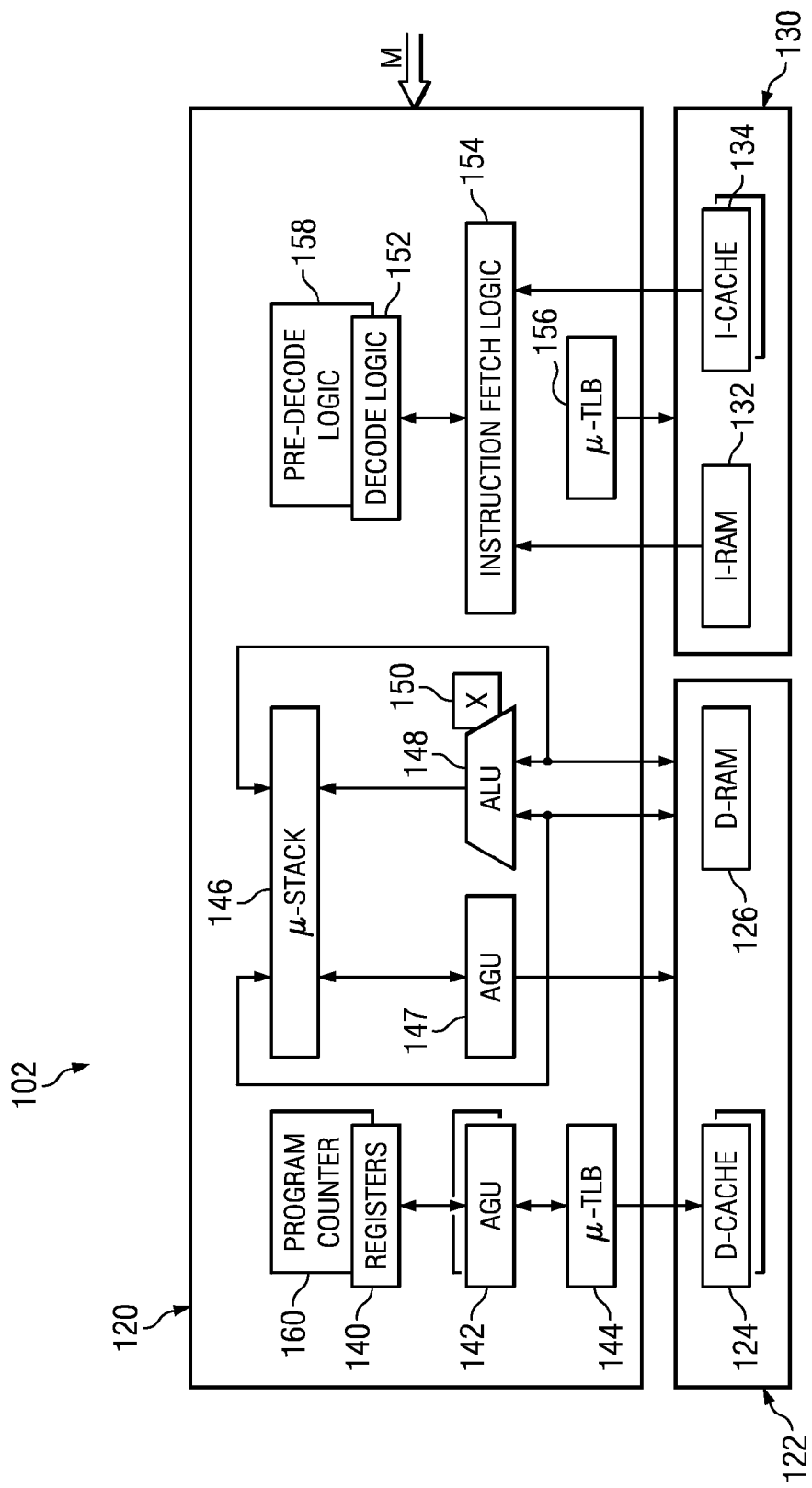
FIG. 2 shows a block diagram of the JSM of FIG. 1 in accordance with preferred embodiments of the invention.

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor. The processor described herein may be particularly suited for executing Java™ Bytecodes, or comparable, code. As is well known, Java is particularly suited for embedded applications. Java is a relatively "dense" language meaning that on average, each instruction may perform a large number of functions compared to many other programming languages. The dense nature of Java is of particular benefit for portable, battery-operated devices that preferably include as little memory as possible to save space and power. The reason, however, for executing Java code is not material to this disclosure or the claims that follow. The embodiment of the invention may be described in the context of Java but should not limit the execution of only Java instructions. The processor described herein may be used in a wide variety of electronic systems.

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as well.

As is generally well known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web-based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, Bytecode verifier, garbage collector, and a Bytecode interpreter loop to interpret the Bytecodes that are not executed on the JSM processor 102.

In accordance with preferred embodiments of the invention, the JSM 102 may execute at least two instruction sets. One instruction set may comprise standard Java Bytecodes. As is well known, Java is a stack-based programming language in which instructions generally target a stack. For example, an integer add ("IADD") Java instruction pops two integers off the top of the stack, adds them together, and pushes the sum back on the stack. In general, the JSM 102 comprises a stack-based architecture with various features that accelerate the execution of stack-based Java code.

Another instruction set executed by the JSM 102 may include instructions other than standard Java instructions. In accordance with at least some embodiments of the invention, such other instruction set may include register-based and memory-based operations to be performed. This other instruction set generally complements the Java instruction set and, accordingly, may be referred to as a complementary instruction set architecture ("C-ISA"). By complementary, it is meant that the execution of more complex Java Bytecodes may be substituted by micro-sequences using C-ISA instructions that permit address calculation to readily "walk through" the JVM data structures. Further, such micro-sequences may also use Bytecode instructions. The execution of Java may be made more efficient and run faster by replacing some sequences of Bytecodes by preferably shorter and more efficient sequences of C-ISA instructions. Bytecodes may also be used within a C-ISA sequence. The two sets of instructions may be used in a complementary fashion to obtain satisfactory code density and efficiency. As such, the JSM 102 generally comprises a stack-based architecture for efficient and accelerated execution of Java Bytecodes combined with a register-based architecture for executing register and memory based C-ISA instructions. Both architectures preferably are tightly combined and integrated through the C-ISA.

FIG. 2 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside; buffers (micro-TLBs) 144, 156, a multi-entry micro-stack 146, an arithmetic logic unit ("ALU") 148, a multiplier 150, decode logic 152, instruction fetch logic 154, and pre-decode logic 158. In general, operands may be retrieved from data storage 122 or from the micro-stack 146, processed by the ALU 148, while instructions may be fetched from instruction storage 130 by fetch logic 154, pre-decoded by pre-decode logic 158, and decoded by decode logic 152. The address generation unit 142 may be used to calculate addresses based, at least in part on data contained in the registers 140. The AGUs 142 may calculate addresses for C-ISA instructions as will be described below. The AGUs 142 may support parallel data accesses for C-ISA instructions that perform array or other types of processing. AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104. The decode logic 152 and the pre-decode logic 158 may be adapted to execute both the standard Java instructions as well as the C-ISA instructions of the system. In addition, the decode logic 152 and the pre-decode logic 158 may also be adapted to execute instructions of different format, including, but not limited to, variable opcode lengths and variable instruction lengths. The operation of the decode logic 152 and the pre-decode logic 158 will be described in more detail below.

Referring now to FIG. 3, the registers 140 may include 16 registers designated as R0-R15. Registers R0-R3, R5, R8-R11 and R13-R14 may be used as general purposes ("GP") registers usable for any purpose by the programmer. Other registers, and some of the GP registers, may be used for specific functions. For example, registers R4 and R12 may be used to store two program counters. Register. R4 preferably is used to store the program counter ("PC") and register R12 preferably is used to store a micro-program counter ("micro-PC"). In addition to use as a GP register, register R5 may be used to store the base address of a portion of memory in which Java local variables may be stored when used by the current Java method. The top of the micro-stack 146 is referenced in registers R6 and R7. The top of the micro-stack has a matching address in external memory pointed to by register R6. The values contained in the micro-stack are the latest updated values, while their corresponding values in external memory may or may not be up- to date. Register R7 provides the data value stored at the top of the micro-stack. Registers R8 and R9 may also be used to hold the address index 0 ("AI0") and address index 1 ("AI1"). Register R14 may also be used to hold the indirect register index ("IRI"). Register R15 may be used for status and control of the JSM 102. As an example, one status/control bit (called the "Micro-Sequence-Active" bit) may indicate if the JSM 102 is executing a "simple" instruction or a "complex" instruction through a "micro-sequence." This bit controls in particular, which program counter is used R4 (PC) or R12 (micro-PC) to fetch the next instruction. A "simple" Bytecode instruction is generally one in which the JSM 102 may perform an immediate operation either in a single cycle (e.g., an "iadd" instruction) or in several cycles (e.g., "dup2_x2"). A "complex" Bytecode instruction is one in which several memory accesses may be required to be made within the JVM data structures for various verifications (NULL pointer, array boundaries, etc.). Because these data structures are generally JVM-dependent and thus may change from one JVM implementation to another, the software flexibility of the micro-sequence provides a mechanism for various JVM optimizations now known or later developed.

Referring again to FIG. 2, as noted above, the JSM 102 may be adapted to process and execute instructions from at least two instruction sets. One instruction set includes stack-based operations and the second instruction set includes register-based and memory-based operations. The stack-based-instruction set may include Java Bytecodes. Java Bytecodes pop, unless empty, data from and push data onto the micro-stack 146. The micro-stack 146 preferably comprises the top n entries of a larger stack that may be implemented in data storage 122. Although the value of n may be vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The second, register-based, memory-based instruction set may comprise the C-ISA instruction set introduced above. The C-ISA instruction set preferably is complementary to the Java Bytecode instruction set in that the C-ISA instructions may be used to accelerate or otherwise enhance the execution of Java Bytecodes.

The ALU 148 adds, subtracts, and shifts data. The multiplier 150 may be used to multiply two values together in one or more cycles. The instruction fetch logic 154 generally fetches instructions from instruction storage 130. The instructions may first be pre-decoded by the pre-decode logic by 158 and decoded by decode logic 152. Because the JSM 102 may be adapted to process instructions from at least two instruction sets, the decode logic 152 generally comprises at least two modes of operation, one mode for each instruction set. In particular, the decode logic unit 152 may include a Java mode in which Java instructions may be decoded and a C-ISA mode in which C-ISA instructions may be decoded. The decoding mode may be changed temporary to let a single instruction from the other instruction set to be executed in the mode set for the other instruction set. The instruction simply needs to be preceded by a byte such as the Java impdep1 byte. The pre-decode logic 158 determines if an instruction is preceded by this byte and consider this byte as an instruction prefix. The decode logic 152 and the pre-decode logic 158 may also decode instructions having variable formats based on the detection of a byte (e.g. wide) preceding these instructions, as will be discussed below.

The data storage 122 generally comprises data cache ("D-cache") 124 and data random access memory ("D-RAMset") 126. Reference may be made to copending applications U.S. Ser. No. 09/591,537 filed Jun. 9, 2000, Ser. No. 09/591,656 filed Jun. 9, 2000, and Ser. No. 09/932,794 filed Aug. 17, 2001, all of which are incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAMset 132 may be used for "complex" micro-sequenced Bytecodes or other "micro-sequences or critical sequences of codes," as will be described below. The I-cache 134 may be used to store other types of Java Bytecode and mixed Java/CISA instructions.

In accordance with the preferred embodiments, while the decode logic 152 decodes a current instruction, the pre-decode logic preferably decodes at least the first byte of the next instruction that follows the current instruction to determine whether the next instruction is preceded by predetermined prefixes. These prefixes are encoded on a byte in the preferred embodiment. The prefixes may be a single byte Java instruction (e.g., a Java wide instruction or a Java impdep1 instruction) and may precede a next instruction, and thus, may be appended to the next instruction. Because in general the current instruction may be of a variable length, the first byte of the next instruction's Bytecodes may not be known a priori. Thus, the preferred implementation is to pre-decode enough Bytecodes ahead of the current value of the program counter to ensure that the beginning of the subsequent instruction is captured. In accordance with some embodiments, enough subsequent Bytecodes are pre-decoded to determine whether the next includes a predetermined prefix. In other embodiments, it is determined whether any of the instructions following the current instruction comprise a predetermined prefix, not just the next instruction.

Figure 4:
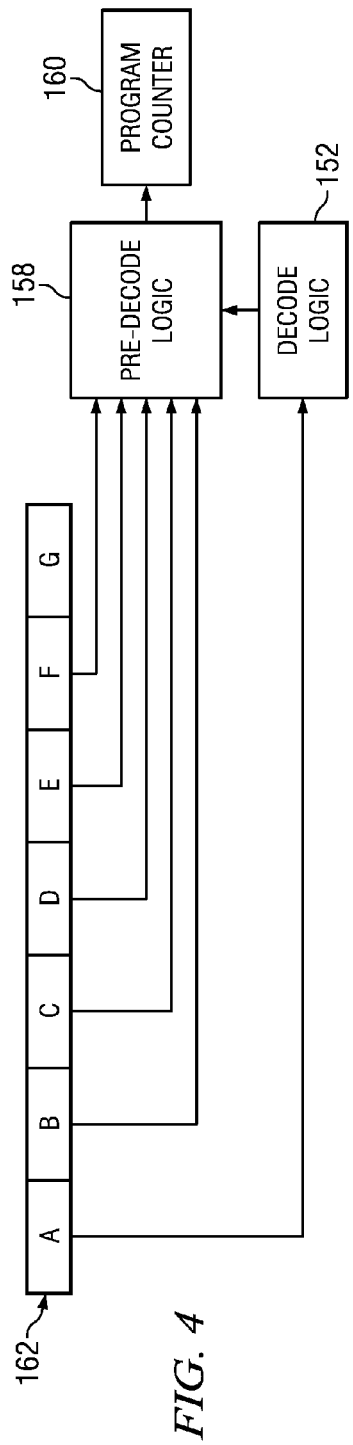
FIG. 4 illustrates decoding and pre-decoding instructions in parallel.

Referring to FIG. 4, a portion of a program may include a plurality of Bytes in register 162 (labeled as Bytes A-G). In Java, those bytes are called Bytecodes. Therefore, for simplicity, these bytes may be referred as Bytecodes in both instruction sets. One or more of those bytes form a Java instruction. The Java instruction set, therefore, may include variable length instructions. In C-ISA, the instruction length may also vary in length (e.g., 2 to. 4 bytes) and like the Java instructions, the length may only be determined during the decode. In accordance with the preferred embodiments, while the decode logic 152 is decoding Bytecode A, in which Bytecode A may be all or a portion of a current instruction, the next five Bytecodes preferably are provided to pre-decode logic 158. As illustrated, Bytecodes B through F are pre-decoded by the pre-decode logic 158 in parallel with the decoding of Bytecode A. The pre-decode logic 158 preferably determines if any of Bytecodes B through F include a predetermined "prefix." A prefix, as used herein, is a Bytecode that indicates the type of instruction that follows the prefix. For example, a format of an instruction, such as a "wide" instruction, may include a Java wide bytecode used as a prefix. In yet another example, a prefix (e.g., one of the Java implementation dependent and reserved code "Impdep1" Bytecode) may be used as a prefix and may indicate the presence of an instruction that belongs to a particular instruction set. As such, by first determining if an instruction differs in format or if the instruction belongs to a particular instruction set, the decode logic 158 may adjust the decoding behavior for decoding of the instruction.

In accordance with preferred embodiments of the invention, when the decode logic 152 is ready to begin decoding the next instruction, the program counter 160 (which may be stored in register R4, R12) may be incremented if the presence of a prefix in the next instruction was detected ahead of time by the pre-decode logic 158. In particular, the program counter may be incremented to skip the prefix and point to the next Bytecode in the sequence 162. As such, time and processor resources are not expended decoding the predetermined prefix.

Referring again to the example of FIG. 4, the decode logic 152 preferably decodes Bytecode A in parallel with the pre-code logic 158 pre-decoding Bytecodes B through F. During this pre-decode process, the pre-decode logic 158 may determine that Bytecode B may be preceded by a predetermined prefix (e.g., a Java "wide" prefix or a Java "impdep1" prefix). Once the decoding of Bytecode A is completed and Bytecode B has been determined by the pre-decode logic 158 to include the predetermined prefix, the program counter 160, currently pointing to Bytecode A, may be incremented to skip Bytecode B and point to Bytecode C. As such, when the decode logic 152 is finished decoding Bytecode A, the decode logic 152 decodes Bytecode C and skips Bytecode B.

Figure 5:
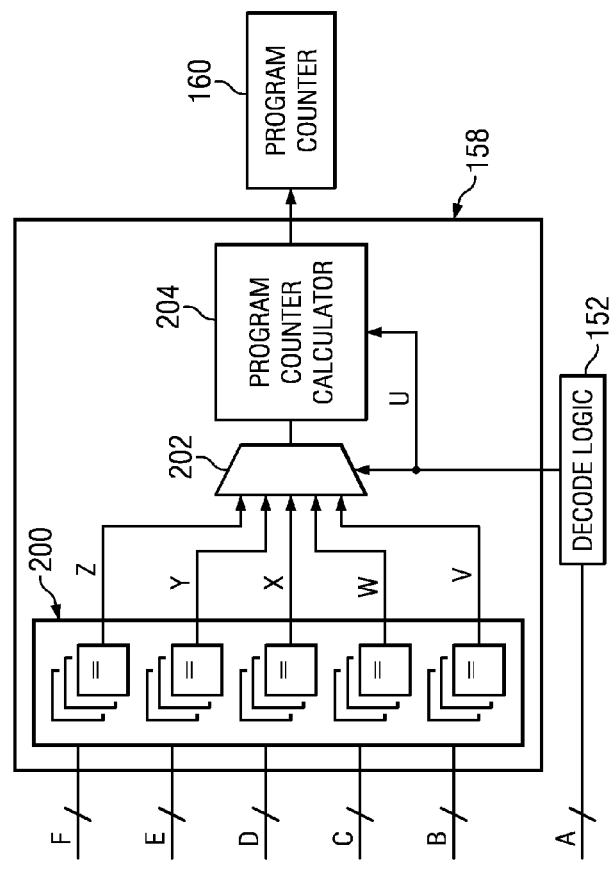
FIG. 5 shows a block diagram of a pre-decode logic usable in the JSM.

In order to determine if a Bytecode comprises the predetermined prefix, the pre-decode logic 158 compares the m (e.g., five) Bytecodes following the Bytecode pointed to by the program counter with a predetermined set of bytes indicative of the predetermined prefix. Referring to FIG. 5, the pre-decode logic 158 includes a plurality of comparators 200 and a multiplexer 202. In at least some embodiments, each of Bytecodes B through F may be compared to a predetermined prefix value. The prefix value may be equal to a Java wide prefix. A Java wide prefix, as described herein, may be an opcode that indicates the format of the instruction that immediately succeeds the prefix may be of a different format. More specifically, a Java wide prefix may extend the number of bits the succeeding instruction may contain. For example, a Java instruction, may include, but is not limited to, a parameter of eight bits. The Java wide prefix, may extend the Java instruction parameter to, for example, 16 bits. As such, to determine if the format of an instruction is different, each Bytecode B through F is compared to the Java wide prefix.

In some embodiments, a single Bytecode may match the Java wide prefix out of the five Bytecodes B through F. As such, if Bytecode C match the Java wide prefix, a high logic value, e.g., a logic "1", may be provided to multiplexer 202 via signal line W. A logic low value, e.g., a logic "0", may be provided to multiplexer 202 via signal lines V and X through Z. Based on the instruction length of the current instruction decoded by the decode logic 152, select line U may be provided to select from signal lines V through Z. For example, if Bytecode A is a single byte Java instruction, the decode logic provides a value n, where n is the number of Bytecode(s) that make up the current instruction decoded by the decoding logic 152. Since Bytecode A is a single byte Java instruction, select line U would select the next Bytecode, e.g., Bytecode B. If Bytecode B match the Java wide prefix, the program counter calculator 204, wherein the program counter calculator may be one or several adders, would increment the program counter 160 by n+1. As such, the program counter 160 would skip Bytecode B and load the value of Bytecode C into the decode logic 152.

In some other embodiments, a plurality of the Bytecodes out of Bytecodes B through F may match the Java wide prefix. Similar to the process of determining the increment value of the program counter 160 for a single Bytecode match to the wide prefix the program counter may be incremented based on the instruction length of the current instruction decoded by the decode logic 152. In particular, if Bytecodes B and F match the Java wide prefix, the program counter may be incremented to skip Bytecode B and subsequently skip Bytecode F.

Bytecodes B through F also may be compared to prefixes besides wide or to multiple prefix values. For example, Bytecodes B through F may be compared to a Java wide prefix and also to a Java impdep prefix. A Java impdep prefix (e.g., impdep 1 or impdep 2) is an implementation dependent instruction. In a preferred embodiment, the Java impdep prefix may indicate that the succeeding instruction following the impdep prefix may be from a different instruction set as the previous instruction, such as a C-ISA instruction. Similar to the process for determining if Bytecodes B through F include a Java wide prefix, Bytecodes B through F also may be compared to a prefix value representative of a Java impdep prefix. Upon determining if at least one of the subsequent Bytecode is a Java impdep prefix, the program counter 160 may skip the prefix and load the value of the next Bytecode into the decoder. For example, while decoder 152 decodes Bytecode C of a current instruction, pre-decoder 158 may determine that Bytecode D is equal to the impdep prefix. Subsequently, the program counter 160 may skip over Bytecode D to Bytecode E. After the decoder 152 decodes Bytecode C, the decoder 152 decodes Bytecode E, without decoding Bytecode D.

In some embodiments, the sequential execution of the Bytecodes may be interrupted after a prefix has been pre-decoded by the pre-decode logic 158 but before the next instruction is loaded into the decode logic 152. For example, the decode logic 152 may currently decode a branch Bytecode which may interrupt the sequential execution of the plurality of bytes. Consequently, upon returning from the execution of the branch Bytecode, the prefix may be loaded into the decode logic 152. In this case, the prefix may be treated as a NOP because the prefix is presented as a first instruction without being pre-decoded, entering the decoder directly.

By predetermining if an instruction comprises a prefix, the behavior of decoder 152 may be modified to accommodate the instruction. Furthermore, by predetermining the prefix of a subsequent instruction in parallel with the decoding of a current instruction, the decoder 152 may avoid decoding the prefix, improving the cycle time of decoding instructions of a different format and also instructions from a different instruction set.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A system comprising:
A. a memory containing instructions;
B. a main processor unit coupled to the memory and executing instructions obtained from the memory;
C. a stack machine, separate from the main processor unit, coupled to the memory and executing instruction bytecodes obtained from the memory, the stack machine including:
   i. a program counter containing an address of a first instruction bytecode to be decoded;
   ii. a program counter calculator coupled to the program counter and providing the program counter with the address of the first instruction bytecode to be decoded, the program counter calculator including a match input;
   iii. a register containing instruction bytecodes including the first instruction bytecode and a second instruction bytecode following the first instruction;
   iv. decode logic coupled to the register and to the program counter calculator and decoding the first instruction bytecode from the register;
   v. pre-decode logic having a match output connected with the match input of the program counter calculator and being coupled to the second instruction bytecode in the register, the pre-decode logic decoding the second instruction bytecode while the decode logic is decoding the first instruction bytecode and selectively providing a match signal to the program counter calculator to increment the program counter past the second instruction bytecode and
   vi. the register having instruction sections, each section containing an instruction bytecode, the pre-decode logic includes sets of comparator logic, each comparator logic set has inputs coupled with one instruction section and an output, and the pre-decode logic includes multiplexer circuitry having inputs connected to the outputs of the comparator logic sets and a match output connected with the program counter calculator.

2. The system of claim 1 in which the register has instruction sections, each section containing an instruction bytecode, and the number of sections is greater than the number of instruction bytecodes in the longest instruction.

3. The system of claim 1 in which the pre-decode logic decodes a prefix in the second instruction bytecode.

4. A process of operating a system comprising:
A. placing instructions in a memory;
B. executing instructions obtained from the memory in a main processor unit coupled to the memory;
C. executing instruction bytecodes obtained from the memory in a stack machine coupled to the memory;
D. incrementing a program counter in the stack machine to contain an address of a first instruction bytecode to be decoded;
E. providing the program counter with the address of the first instruction bytecode to be decoded from a program counter calculator having a match input;
F. moving instruction bytecodes including the first instruction bytecode and a second instruction bytecode following the first instruction bytecode into a register;
G. decoding the first instruction bytecode in the register in decode logic coupled to the register and to the program counter calculator;
H. while decoding the first instruction bytecode, pre-decoding at least the second instruction bytecode in pre-decode logic coupled to the register, and selectively providing a match signal from a match output of the pre-decode logic to the match input of the program counter calculator to increment the program counter past the second instruction bytecode;

l. the moving including moving instruction bytecodes into register sections, each section containing an instruction bytecode, and the pre-decoding includes comparing the instruction bytecode in each instruction section with a known prefix and producing a section output, and multiplexing the section outputs to the match output.

5. The process of claim 4 in which the moving includes moving instruction bytecodes into register sections, each section containing an instruction byte, and the number of sections is greater than the number of instruction bytecodes in the longest instruction.

6. The process of claim 4 in which pre-decoding logic pre-decoding a prefix in the second instruction bytecode.

* * * * *